April 9, 1963     E. SKOLNIK     3,084,796
MAGNETIC HEAVY MEDIUM TREATMENT PROCESS AND APPARATUS
Original Filed March 23, 1960
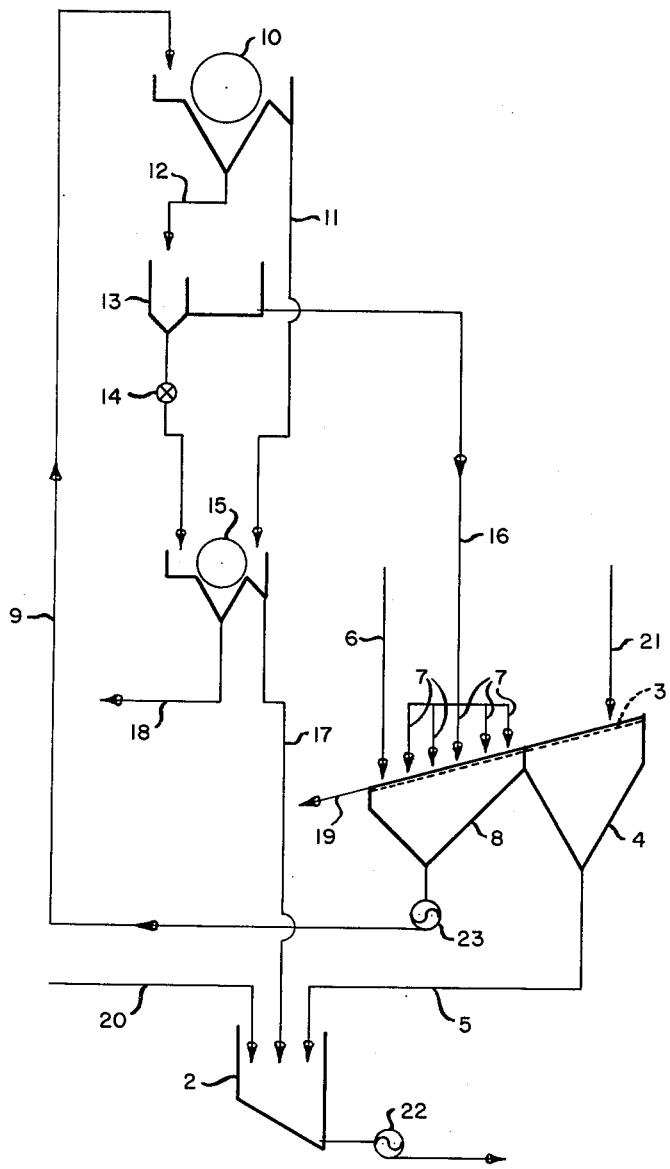
INVENTOR
Edward Skolnik United States Patent Office 3,084,796
Patented Apr. 9, 1963

3,084,796
MAGNETIC HEAVY MEDIUM TREATMENT
PROCESS AND APPARATUS
Edward Skolnik, Pittsburgh, Pa., assignor to Heyl & Patterson, Inc., Pittsburgh, Pa., a corporation of Pennsylvania
Continuation of application Ser. No. 17,178, Mar. 23, 1960. This application Dec. 29, 1961, Ser. No. 163,134
6 Claims. (Cl. 209—38)

This invention relates to a process and apparatus employing magnetic heavy media. It has to do particularly with a novel method and apparatus for recovering magnetics and preventing build-up of non-magnetic particles. This application is a continuation of my copending application Serial No. 17,178, filed March 23, 1960, now abandoned.

In a heavy medium treatment process employing magnetic media the magnetics are rinsed from the products of the process by water and then thickened or dewatered for reuse. An example is a coal treatment process employing magnetite in water as a medium for separating a comparatively light low-ash coal from a comparatively heavy high-ash refuse. The products emerging from the process may be passed over a screen, some of the magnetite and water draining through the screen without dilution and being returned for reuse. Comparatively magnetite-free water is then used to rinse the coal. When the magnetite is separated from the rinse water the magnetite is available for reuse and the water is also available for reuse in rinsing. Part of the separating of the magnetite from the rinse water may be effected in static tanks, cyclones, or other appropriate apparatus. However, there is always a quantity of fine non-magnetic material which must be removed from the water to prevent a build-up of such material.

The size and number of magnetic separators required in a plant depends on both the volume of water to be processed and the tonnage of magnetics it contains. Since the volume generally governs it is customary in washing cyclone plants, where large volumes of rinsing water must be used, to thicken the magnetics before using magnetic separation to separate the magnetics from the rinsing screen effluent water; when this is done the thickener effluents containing some magnetic and non-magnetic fines are returned for use as pre-rinse water. The somewhat thickened magnetics may be directly reused in part, but enough must be subjected to magnetic separation so that entrapped non-magnetic particles can be separated from the magnetics and wasted from the plant. In general the quantities which must go to magnetic separation and to waste increase rapidly with the fineness of the coal being processed because more magnetics will report with the rinsings, more water is required for adequate rinsing, and more fine non-magnetic particles must be wasted.

I deliver all of the rinsing screen effluent water containing magnetic and non-magnetic particles to a primary magnetic separator, in the primary magnetic separator separate most of the magnetics from the water although leaving in the water too much magnetic medium for the water to be wasted but not enough magnetics to render the water unsuitable for use as pre-rinse water, utilize the greater part of such magnetics-containing water as pre-rinse water, deliver the remainder of such magnetics-containing water to a secondary magnetic separator, in the secondary magnetic separator separate nearly all of the remainder of the magnetics from the remainder of the water, waste such water containing non-magnetic particles and only stray magnetic particles to prevent a build-up of non-magnetic particles and reuse the magnetics recovered in the primary and secondary magnetic separators. I preferably substantially overload the primary magnetic separator with respect to volume and therein separate most of the magnetics from the water, the magnetics thus separated being almost entirely free from non-magnetic particles.

In a heavy medium coal separation process employing magnetics I deliver coal and magnetics-containing water to a cyclone, in the cyclone separate coal from refuse, pass the separated products over screens, rinse the separated products on the screens by water, deliver rinsings water containing magnetic and non-magnetic particles to a primary magnetic separator, in the primary magnetic separator separate most of the magnetics from the water, leaving in the water not enough magnetics to render the water unsuitable for use as pre-rinse water, utilize the greater part of such magnetics-containing water as pre-rinse water, deliver the remainder of such magnetics-containing water to a secondary magnetic separator, in the secondary magnetic separator separate nearly all of the remainder of the magnetics from the remainder of the water, waste such water-containing non-magnetic particles to prevent a build-up of non-magnetic particles and reuse the magnetics recovered in the primary and secondary magnetic separators.

I provide magnetic heavy medium treatment apparatus comprising a primary magnetic separator to which rinsings water containing magnetic and non-magnetic particles is delivered and in which most of the magnetics are separated from the water but enough magnetics remain in the water so that the water should not be wasted but not enough magnetics remain in the water to render the water unsuitable for use as pre-rinse water, a secondary magnetic separator to which a portion of such magnetics-containing water is delivered and in which nearly all of the magnetics are separated from the portion of the water, means leading such water containing non-magnetic particles from the secondary magnetic separator to waste to prevent a build-up of non-magnetic particles, means returning the magnetics recovered in the primary and secondary magnetic separators for reuse, and means returning the bulk of the water leaving the primary separator for reuse as rinse water.

Other details, objects and advantages of the invention will become apparent as the following description of a present preferred embodiment thereof and a present preferred method of practicing the same proceeds.

In the accompanying drawing I have illustrated a present preferred embodiment of the invention and a present preferred method of practicing the same, the FIGURE being a flow diagram of a magnetics separation and recovery process and apparatus.

Referring to the drawing, raw coal, magnetics and water drained from a screen are delivered respectively as indicated at 20, 17 and 5 into a receptacle 2 and pass together through a pump 22 to a washing cyclone or cyclones. The coal is in the cyclone or cyclones separated from the refuse in known manner and is delivered at 21 upon a screen 3. Some of the water-magnetics medium passes through the screen 3 into a receptacle 4 and thence back through a pipe 5 into the receptacle 2. The coal passing down the screen 3 is rinsed by water delivered through nozzles 6 and 7. The water delivered through the nozzle 6 is fresh water while the water delivered through the nozzles 7 is pre-rinse water derived as will now be described. The rinsings, including water, magnetics and non-magnetic particles, are received in a receptacle 8 and pass through a pump 23 and a pipe 9 into a primary magnetic separator 10. While but one primary magnetic separator is illustrated and while I use the singular number in referring thereto there may be a battery of primary magnetic separators. I preferably substantially overload the primary magnetic separator 10 with respect to volume.

In the primary magnetic separator 10 I separate the magnetics from the water containing non-magnetic particles. The concentrated magnetics are delivered through a pipe 11 and the water containing non-magnetic particles is delivered through a pipe 12. The water containing non-magnetic particles delivered through the pipe 12 also contains too much magnetic medium to be wasted but not enough to render the water unsuitable for use as pre-rinse water. It is delivered into a receptacle 13 from which a portion is allowed to gravitate past a valve or other flow control device 14 into a secondary magnetic separator 15. The valve or other flow control device 14 constitutes means for controllably predetermining the quantity of the magnetics-containing water used as pre-rinse water and the quantity of the magnetics-containing water delivered to the secondary magnetic separator. While but one secondary magnetic separator is illustrated and while I use the singular number in referring thereto there may be a battery of secondary magnetic separators. Most of the water containing non-magnetic particles and some magnetics is delivered through a pipe 16 to the nozzles 7.

The portion of the water containing non-magnetic particles and some magnetics gravitating past the valve 14 into the secondary magnetic separator 15 has the magnetics separated from the water and non-magnetic particles, the the magnetics passing through a pipe 17 and along with the magnetics from the pipe 11 being returned to the receptacle 2. The water containing the non-magnetic particles passes through a pipe 18 to waste. The clean coal is delivered from the screen 3 by any suitable conveying means 19.

The quantity of water containing non-magnetic particles which passes through the pipe 18 to waste is determined by the extent to which the valve or other flow control device 14 is opened. When the material being treated contains a relatively great proportion of non-magnetic particles the valve or other flow control device 14 will be opened relatively wide but not beyond the capacity of the secondary magnetic separator 15. The secondary magnetic separator 15 is of smaller capacity than the primary magnetic separator 10 because it has to handle a smaller flow. Making of the secondary magnetic separator of smaller capacity than the primary magnetic separator effects a substantial saving in the cost of the apparatus. The secondary magnetic separator is designed to handle the maximum flow normally expected to be delivered through the valve or other flow control device 14.

The overloading of the primary magnetic separator 10 causes the magnetics passing through the pipe 11 to be almost entirely free from non-magnetic particles while perhaps two or three percent of magnetics remain in the water delivered through the pipe 12. I preferably overload the primary magnetic separator 10 by as much as fifty percent.

Advantages of my invention are:

(1) Less magnetic separation area is required than would be necessary if a portion of the tails delivered through the pipe 12 from the primary magnetic separator 10 were to be bled without secondary separation.

(2) The cost of the primary magnetic separator compares favorably with the cost of other means of preparing pre-rinse water such as static thickeners, cyclones, etc.

(3) I produce clearer pre-rinse water than could be obtained otherwise; this is because the rate of recovery of magnetics, while very poor for a magnetic separator, is much higher than for thickeners generally.

(4) I produce cleaner magnetic concentrate at both stages than can be produced by feeding pre-thickened magnetics to magnetic separators.

(5) Loss of magnetics is considerably less than can be achieved in a single stage of separation.

While I have shown and described a present preferred embodiment of the invention and have illustrated a present preferred method of practicing the same it is to be distinctly understood that the invention is not limited thereto but may be otherwise variously embodied and practiced within the scope of the following claims.

I claim:

1. In a heavy medium treatment process employing a magnetic medium, delivering rinse water containing magnetic and non-magnetic particles to a primary magnetic separator, in the primary magnetic separator separating most of the magnetics from the water leaving the water sufficiently free from magnetics to render the water suitable for use as pre-rinse water, utilizing the greater part of such magnetics-containing water as pre-rinse water, delivering the remainder of such magnetics-containing water to a secondary magnetic separator, controllably predetermining the quantity of the magnetics-containing water utilized as pre-rinse water and the quantity of the magnetics-containing water delivered to the secondary magnetic separator, in the secondary magnetic separator separating nearly all of the remainder of the magnetics from the remainder of the water, removing from the heavy medium circuit such water containing non-magnetic particles to prevent a build-up of non-magnetic particles and reusing the magnetics recovered in the primary and secondary magnetic separators.

2. In a heavy medium treatment process employing a magnetic medium, delivering rinse water containing magnetic and non-magnetic particles to a primary magnetic separator, substantially overloading the primary magnetic separator with respect to volume and therein separating most of the magnetics from the water, the magnetics thus separated being almost entirely free from non-magnetic particles, leaving the water sufficiently free from magnetics to render the water suitable for use as pre-rinse water, utilizing the greater part of such magnetics-containing water as pre-rinse water, delivering the remainder of such magnetics-containing water to a secondary magnetic separator, controllably predetermining the quantity of the magnetics-containing water utilized as pre-rinse water and the quantity of the magnetics-containing water delivered to the secondary magnetic separator, in the secondary magnetic separator separating nearly all of the remainder of the magnetics from the remainder of the water, removing from the heavy medium circuit such water containing non-magnetic particles to prevent a build-up of non-magnetic particles and reusing the magnetics recovered in the primary and secondary magnetic separators.

3. In a heavy medium coal separation process employing a magnetic medium, delivering coal and magnetics-containing water to a cyclone, in the cyclone separating coal from refuse, passing the separated coal over a screen, rinsing the separated coal on the screen by water, delivering rinse water containing magnetic and non-magnetic particles to a primary magnetic separator, in the primary magnetic separator separating most of the magnetics from the water, leaving the water sufficiently free from magnetics to render the water suitable for use as pre-rinse water, utilizing the greater part of such magnetics-containing water as pre-rinse water, delivering the remainder of such magnetics-containing water to a secondary magnetic separator, controllably predetermining the quantity of the magnetics-containing water utilized as pre-rinse water and the quantity of the magnetics-containing water delivered to the secondary magnetic separator, in the secondary magnetic separator separating nearly all of the remainder of the magnetics from the remainder of the water, removing from the heavy medium circuit such water containing non-magnetic particles to prevent a build-up of non-magnetic particles and reusing the magnetics recovered in the primary and secondary magnetic separators.

4. In a heavy medium treatment process employing a magnetic medium, delivering rinse water containing magnetic and non-magnetic particles to a primary magnetic separator, in the primary magentic separator separating most of the magnetics from the water leaving the water sufficiently free from magnetics to render the water suitable for use as pre-rinse water, utilizing the greater part of such magnetics-containing water as pre-rinse water, delivering the remainder of such magnetics-containing water to a secondary magnetic separator of smaller capacity than the primary magnetic separator, controllably predetermining the quantity of the magnetics-containing water utilized as pre-rinse water and the quantity of the magnetics-containing water delivered to the secondary magnetic separator, in the secondary magnetic separator separating nearly all of the remainder of the magnetics from the remainder of the water, removing from the heavy medium circuit such water containing non-magnetic particles to prevent a build-up of non-magnetic particles and reusing the magnetics recovered in the primary and secondary magnetic separators.

5. Magnetic heavy medium treatment apparatus comprising a primary magnetic separator to which rinse water containing magnetic and non-magnetic particles is delivered and in which most of the magnetics are separated from the water but some magnetics are left in the water wherefore the water should not be wasted, but the water is left sufficiently free from magnetics so as to be suitable for use as pre-rinse water, means separating such magnetics-containing water into two fractions one of which is used as pre-rinse water, a secondary magnetic separator to which the remainder of such magnetics-containing water is delivered and in which nearly all of the remainder of the magnetics are separated from the remainder of the water, means controllably predetermining the quantity of the magnetics-containing water used as pre-rinse water and the quantity of the magnetics-containing water delivered to the secondary magnetic separator, means leading such water containing non-magnetic particles from the secondary magnetic separator from the heavy medium circuit to prevent a build-up of non-magnetic particles and means returning the magnetics recovered in the primary and secondary magnetic separators for reuse.

6. Magnetic heavy medium treatment apparatus comprising a primary magnetic separator to which rinse water containing magnetic and non-magnetic particles is delivered and in which most of the magnetics are separated from the water but some magnetics are left in the water wherefore the water should not be wasted, but the water is left sufficiently free from magnetics so as to be suitable for use as pre-rinse water, means separating such magnetics-containing water into two fractions one of which is used as pre-rinse water, a secondary magnetic separator of smaller capacity than the primary magnetic separator to which the remainder of such magnetics-containing water is delivered and in which nearly all of the remainder of the magnetics are separated from the remainder of the water, means for controllably predetermining the quantity of the magnetics-containing water used as pre-rinse water and the quantity of the magnetics-containing water delivered to the secondary magnetic separator, means leading such water containing non-magnetic particles from the secondary magnetic separator from the heavy medium circuit to prevent a build-up of non-magnetic particles and means returning the magnetics recovered in the primary and secondary magnetic separators for reuse.

References Cited in the file of this patent

UNITED STATES PATENTS

| | | |
|---|---|---|
| 2,781,906 | Fontein | Feb. 19, 1957 |
| 2,932,395 | Marot | Apr. 12, 1960 |